(12) United States Patent  
Acree

(10) Patent No.: US 8,693,806 B2  
(45) Date of Patent: Apr. 8, 2014

(54) METHOD AND APPARATUS OF TAKING AERIAL SURVEYS

(71) Applicant: Intergraph Software Technologies Company, Las Vegas, NV (US)

(72) Inventor: Elaine S. Acree, Madison, AL (US)

(73) Assignee: Intergraph Software Technologies Company, Madison, AL (US)

( * ) Notice: Subject to any disclaimer, the term of this patent is extended or adjusted under 35 U.S.C. 154(b) by 0 days.

(21) Appl. No.: 13/679,597

(22) Filed: Nov. 16, 2012

(65) Prior Publication Data

US 2014/0063000 A1    Mar. 6, 2014

Related U.S. Application Data

(63) Continuation of application No. 12/271,448, filed on Nov. 14, 2008, now Pat. No. 8,315,477.

(60) Provisional application No. 60/987,883, filed on Nov. 14, 2007.

(51) Int. Cl.
*G06K 9/36* (2006.01)
*G06K 9/00* (2006.01)

(52) U.S. Cl.
USPC .............................. 382/284; 382/100; 348/61

(58) Field of Classification Search
CPC .................... G06T 3/4038; G06T 5/50; G06T 2207/10016; G06T 7/0034; G06T 3/0043; G06T 2207/10032; G06T 2200/32; G06T 7/0024; G06T 7/0065; G06T 17/00; G06T 17/05; G06T 2207/30181; G06T 3/0062; G06K 9/0063; G06K 9/0065; G06K 9/32; G06K 15/06

See application file for complete search history.

(56) References Cited

U.S. PATENT DOCUMENTS

| | | | | | |
|---|---|---|---|---|---|
| 4,525,858 | A | * | 6/1985 | Cline et al. ..................... | 382/154 |
| 4,945,478 | A | * | 7/1990 | Merickel et al. ............... | 382/131 |
| 5,146,228 | A | * | 9/1992 | Irani et al. ....................... | 342/64 |
| 5,187,754 | A | * | 2/1993 | Currin et al. ................... | 382/284 |
| 5,649,032 | A | * | 7/1997 | Burt et al. ....................... | 382/284 |
| 5,911,035 | A | * | 6/1999 | Tsao ................................ | 706/16 |
| 5,987,164 | A | * | 11/1999 | Szeliski et al. ................. | 382/154 |
| 5,991,444 | A | * | 11/1999 | Burt et al. ....................... | 382/232 |
| 5,999,662 | A | * | 12/1999 | Burt et al. ....................... | 382/284 |
| 6,009,190 | A | * | 12/1999 | Szeliski et al. ................. | 382/154 |
| 6,044,181 | A | * | 3/2000 | Szeliski et al. ................. | 382/284 |
| 6,078,701 | A | * | 6/2000 | Hsu et al. ........................ | 382/294 |
| 6,157,747 | A | * | 12/2000 | Szeliski et al. ................. | 382/284 |
| 6,219,462 | B1 | * | 4/2001 | Anandan et al. ............... | 382/294 |
| 6,256,036 | B1 | * | 7/2001 | Matsumoto ..................... | 345/419 |
| 6,377,278 | B1 | * | 4/2002 | Curtright et al. ............... | 345/634 |
| 6,393,163 | B1 | * | 5/2002 | Burt et al. ....................... | 382/294 |
| 6,434,265 | B1 | * | 8/2002 | Xiong et al. .................... | 382/154 |
| 6,522,787 | B1 | * | 2/2003 | Kumar et al. ................... | 382/268 |
| 6,597,818 | B2 | * | 7/2003 | Kumar et al. ................... | 382/294 |
| 6,757,445 | B1 | * | 6/2004 | Knopp ............................ | 382/285 |
| 6,819,318 | B1 | * | 11/2004 | Geng .............................. | 345/420 |
| 6,947,591 | B2 | * | 9/2005 | Risson ............................ | 382/164 |

* cited by examiner

*Primary Examiner* — Manav Seth

(74) *Attorney, Agent, or Firm* — Sunstein Kann Murphy & Timbers LLP

(57) ABSTRACT

A method of taking an aerial survey maps boundaries of a first image and a second image from a first plane to a second plane to determine boundaries of an output image in the second plane. For a plurality of pixels in the output image, the method determines a corresponding pixel of either the first image or second image in the first plane.

15 Claims, 7 Drawing Sheets

METHOD AND APPARATUS OF TAKING AERIAL SURVEYS

PRIORITY

This application is a continuation of U.S. patent application Ser. No. 12/271,448, filed Nov. 14, 2008, titled "Method and Apparatus of Taking Aerial Surveys" (now U.S. Pat. No. 8,315,477), which claims priority from U.S. Provisional Patent Application Ser. No. 60/987,883, entitled, "Method and Apparatus of Taking Aerial Surveys," filed on Nov. 14, 2007, and naming Elaine S. Acree as inventor, the contents of each of which are hereby incorporated herein, in their entirety, by reference.

TECHNICAL FIELD

The present invention generally relates to an aerial surveying method, and more particularly, the invention relates to an aerial surveying method that combines overlapping video imagery into an overall mosaic using modified 3-D ray tracing and graphics methodologies.

BACKGROUND ART

Unmanned Aerial Vehicles (UAV) or other manned aircraft can fly over areas of interest and make video images of those areas. Such an aerial surveillance has both military and civilian applications in the areas of reconnaissance, security, land management and natural disaster assessment to name a few. The heavily overlapped video imagery produced by the surveillance typically may be transmitted to a ground station where the images can be viewed. However, this heavily overlapped imagery shows only small pieces of a larger area of interest and in that respect is similar to the pieces of a jigsaw puzzle. Until all the pieces are put together in context, the meaning of any individual piece may be misunderstood or unclear. Therefore, a mosaic of the overlapping imagery data is needed. Prior art uses various approaches to merge such overlapping imagery data into an overall mosaic for further use and analysis.

Photogrammetrists mosaic images, but these images are typically orthorectified before the final mosaic is produced. Orthorectification, the process of converting oblique pairs of images into a single corrected top down view, requires stereo images or at least two images taken from different angles using a very high-resolution camera under strictly controlled conditions. Moreover, photogrammetry can be a labor-intensive task, requiring a human operator to place control points in the images prior to further processing. Conversely, NASA has provided image mosaics of planets, the moon and solar systems. Some newer techniques involve wavelet decomposition with equidistant measurement; whereas, older systems refer to more classical photogrammetry approaches to image mosaicking. All of the aforementioned prior art approaches are computation intensive and require extensive data collection.

Others in the field generate what are commonly known as, "Waterfall Displays" with each new image pasted at the end of a strip of the past several images. Old images roll off one end as new images are pasted on the other end. These images are not integrated in any way but are somewhat geo-referenced because one frame tends to be adjacent to the next frame in space. Nevertheless, a Waterfall Display is not a mosaic; it is just a collection of adjacent frames of video. Still others attempt to combine the images using the Optical Flow technique, which combines images based on detected image content but does not utilize geo-referencing information. Still others attempt to merge the pictures without proper integration; instead, the latest image is glued on top of whatever images came before, thereby, losing all the information from the previous images. In this case, the adjacent image edges are not blended resulting in a crude paste up appearance.

These traditional mosaicking techniques as discussed above do not provide a method for rapidly merging heavily overlapped imagery data utilizing geo-referencing information, without extensive data collection or computation.

SUMMARY OF EMBODIMENTS OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all copyrights whatsoever.

In illustrative embodiments, a method merges overlapping imagery data collected during an aerial survey into an overall mosaic of the images to provide useful, integrated information to an image viewer rapidly and without extensive data collection or computation.

To those ends, in various embodiments of the invention, aerial reconnaissance either manned or unmanned may collect the image data over an area of interest along with the supporting numerical Global Positioning System (GPS), Inertial Navigation System (INS) and camera angle data. The mosaics of smaller images provide the viewer with a comprehensive, integrated look at a larger area. A decision maker can review the mosaic level images for current conditions or changes from previous mosaicked images. Automated image processing software could also compare two mosaicked images for differences. Some embodiments have applications in both military and civilian fields, such as military reconnaissance, security, natural disaster assessment, and land management such as fire fighting and drought assessment.

In accordance with one embodiment of the invention, a method of taking an aerial survey maps boundaries of a first image and a second image from a first plane to a second plane to determine boundaries of an output image in the second plane; and for a plurality of pixels in the output image determines a corresponding pixel of either the first image or second image in the first plane.

In accordance with another embodiment of the invention, an aerial survey method maps boundaries of a plurality of images in a first plane to a second plane to determine the boundaries of an output image in the second plane, the plurality of images in the first and second planes and the output image having a plurality of pixels; and for the plurality of pixels in the output image, this embodiment determines a corresponding pixel of the plurality of images in the first plane.

In accordance with yet another embodiment of the invention, an aerial survey method defines an image plane with a plurality of image portions with a resolution; receives one of a plurality of pictures of at least a part of a ground area; divides the ground area part based on the resolution of the image plane to form a plurality of ground portions; and uses ray tracing mathematics to map the plurality of ground portions to the plurality of image portions.

DETAILED DESCRIPTION OF SPECIFIC EMBODIMENTS

Embodiments of the invention involve a two-pass process for combining individual video images, or still frames, with GPS, INS and camera angle data provided per frame, into one, larger, oblique mosaic image. Such embodiments do not require stereo imagery, multiple sets of video on the same area to create stereo imagery, or orthorectification of the imagery prior to creating the mosaic. Unless the context otherwise requires, the two-pass process used to create the output image or mosaic is further defined as follows:

(1) The first pass or Pass One involves reading all of the supporting numerical data including the GPS coordinates, the INS pointing vector angles and the camera field of view angles. The supporting numeric data is then used to compute additional values used to determine the size of the overall output image(s) in terms of both pixels and corresponding GPS coordinates for that output image.

Figure 1:
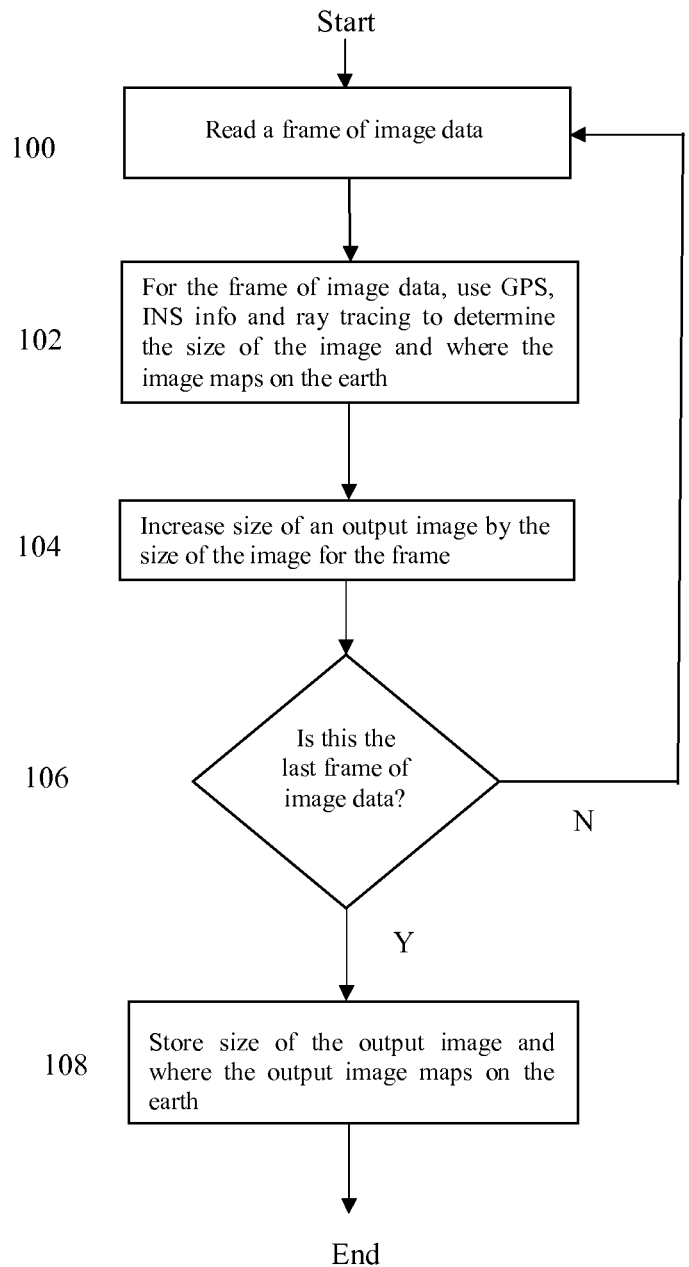
FIG. 1 is a flowchart showing how the size and ground location of an output image is determined.

In a preferred embodiment, Pass One, as shown in FIG. 1, includes the following steps:

(a) Read a video file frame by frame and input the corresponding numeric input GPS coordinates and INS orientation angles, and camera field of view (FOV) angles per frame. The input data is read using standard software techniques.

(b) After accumulating all of the numeric support data on each video frame, calculate the output size of the mosaicked image(s) based on the input GPS coordinates and INS orientation angles and camera angles. Throughout this process, 3-D ray tracing and inverse 3-D ray tracing calculations are used to determine mathematically a ground location of the pixels in the input image.

Figure 2:
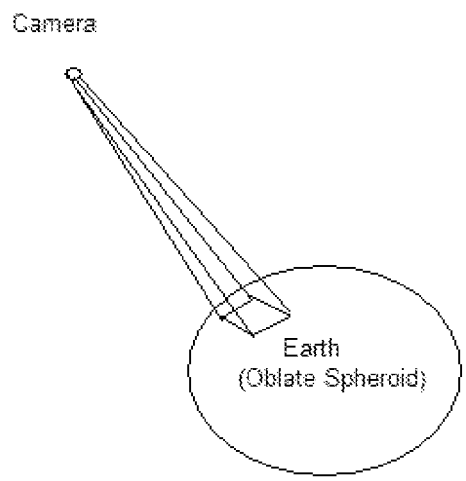
FIG. 2 illustrates the high-level intersection of the camera pyramid with the earth.

The earth is modeled as an oblate spheroid using the parameters of the World Geodetic System 1984 (WGS 84) ellipsoid, which is the ellipsoid upon which the GPS coordinate system is based. WGS 84 and the cartographic literature use the general term ellipsoid to refer to the shape of the earth. In 3-D geometry, the more specific shape of the earth is that of an oblate spheroid. An oblate spheroid used here is an ellipsoid with two identical equatorial radii and a different polar radius to make up the three parameters of the ellipsoidal shape. FIG. 2 illustrates the high-level intersection of a camera pyramid with the earth as an oblate spheroid.

The 3-D ray trace intersection of a ray with an oblate spheroid is derived using the WGS84 ellipsoid whose parameters are specified for the GPS coordinate model. This equation is not a standard ray tracing equation as presented in the standard ray tracing literature, which mostly deals with simple geometric shapes like spheres, boxes, cones, planes and tori. The geo-location intersection calculations utilizing the ray trace intersection with the oblate spheroid as shown below.

(2) The second pass or Pass Two then takes each input image and makes the necessary calculations to map the input image to its final position in the output image(s) or mosaic.

Figure 3A:
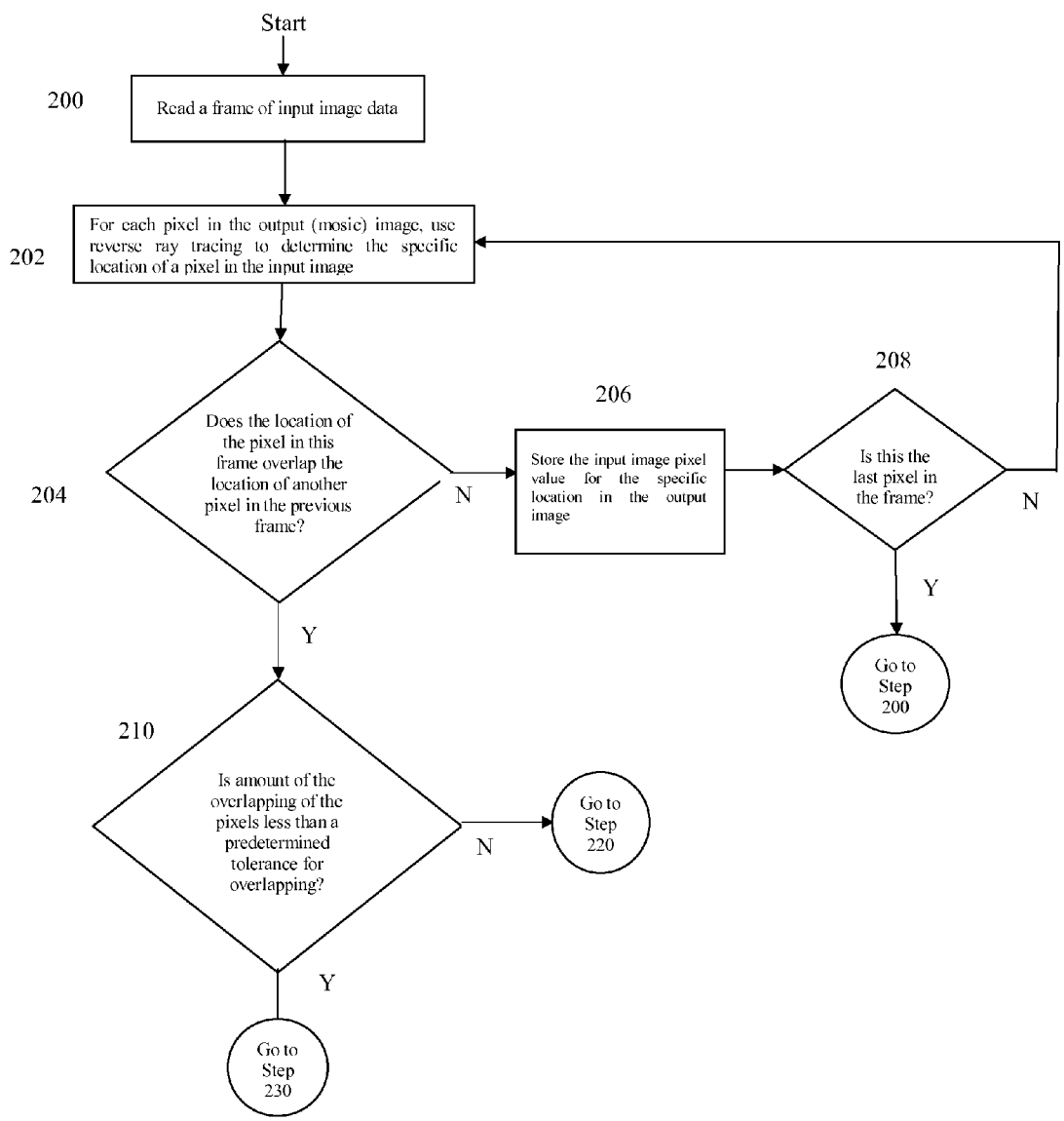
FIG. 3a is a flowchart showing the overlapping pixel selection process.
Figure 3B:
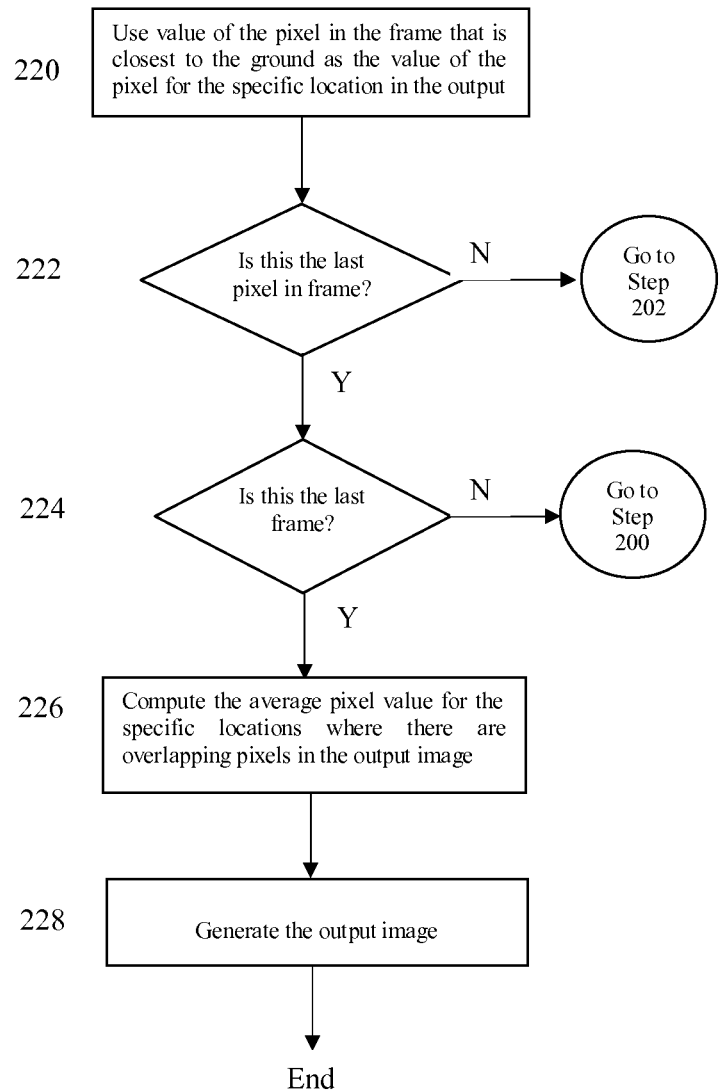
FIG. 3b is a flowchart showing the Best Pixel Rule.
Figure 3C:
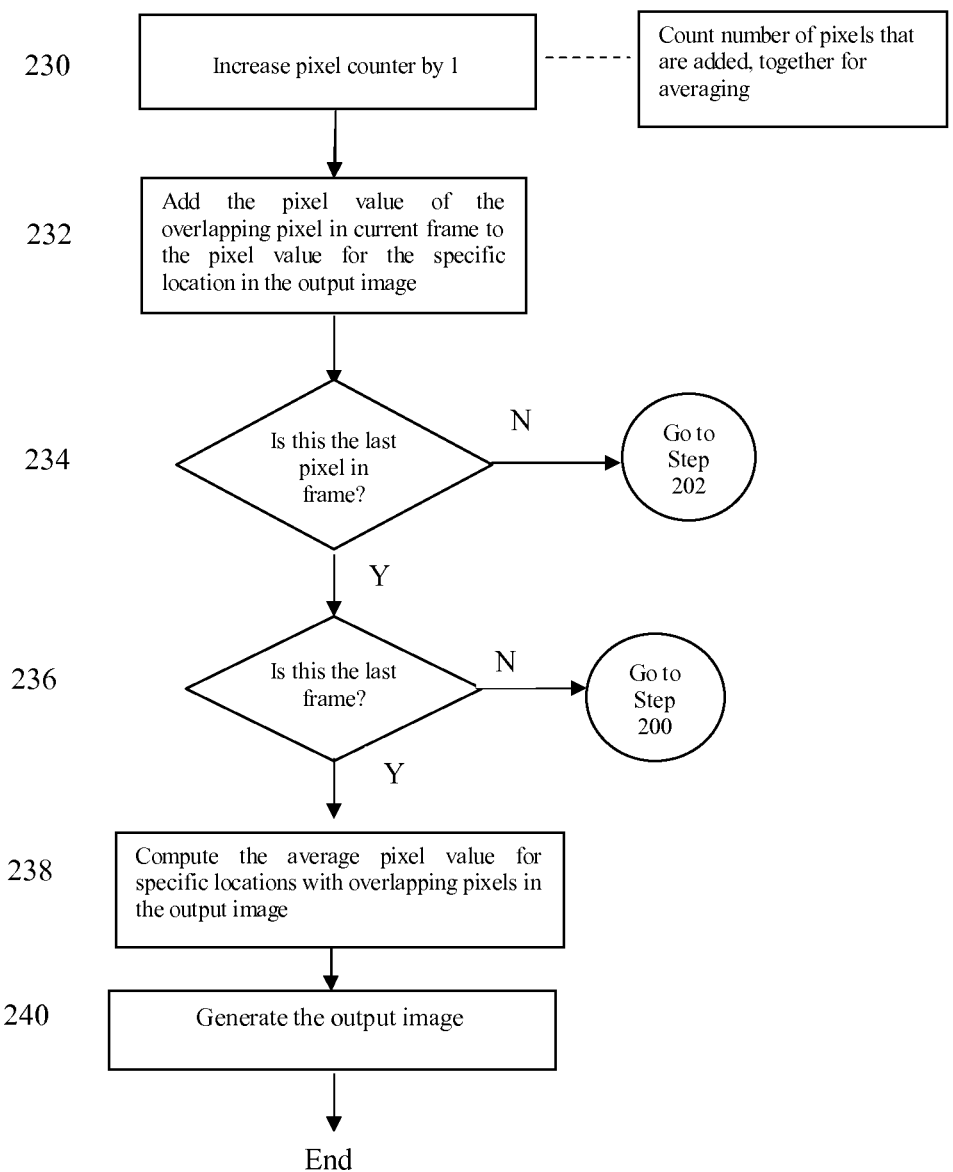
FIG. 3c is a flowchart showing the Overlapping Pixel Tolerance Rule.

In a preferred embodiment, Pass Two, as shown in FIGS. 3a-3b, includes the following steps:

(a) Extract each frame from the video and convert to a single still image using standard tool (b) Take each still image and utilizing 3-D ray tracing equations for an oblate spheroid (earth) and the reverse ray image plane discrete intersection, map each pixel in the output image to a pixel in the input image. The reverse ray trace equation was derived from the ground plane or area back through the camera image plane. This calculation is similar to a ray-plane intersection as found in the standard 3-D graphics ray tracing literature and could not alone be considered a new derivation. However, using the ray-plane intersection calculation in tracing a ray from a 3-D ground location to map to a discrete 2-D pixel on the image plane of the camera is different from the typical application of a fully 3-D to 3-D continuous (not discrete) planar surface-ray intersection.

In an alternative embodiment, multiple output images could be created should a single image be too large for practical usage due to memory limitations. Overall, a single virtual output image can be mapped with the final output of that image tiled in a simple way to an actual output image. These multiple, adjacent, mosaicked images could then be panned to create the same impact of a single mosaicked image.

The input images are heavily overlapped in terms of the ground area. Due to variations in altitude, camera pointing direction and camera angles the pixels on each still input image may be at a different scale in terms of pixel per meters covered on the ground area. Adjustments can be made for each image to map the input pixels to the output pixels based on pixels per meter so that the output image is scaled appropriately. Multiple input pixels may map to the same output pixel.

Furthermore, the geo-referenced coordinate of each pixel is approximate. The GPS coordinate of the camera is known within an error tolerance of the GPS device estimating the location. The INS device provides the camera orientation angles within an error tolerance. The geo-referenced coordinates of the pixels in each image is an estimate based on the GPS location of the camera and the INS data. The estimated geo-referenced coordinate of each pixel may be off slightly from the actual location on the ground. The geo-referenced estimates of pixels closer to the center of the image may be more accurate than the estimates for the pixels on the edge of the image. The error in pixel geo-referencing estimates increases the difficulty in getting a perfect image registration. Image registration refers to aligning one or more images so that the corresponding pixels in those images are on top of each other. With multiple input pixels mapping to the same output pixel, rules must be used to decide which pixel(s) to keep and which to discard.

Several rules are introduced to decide which input pixels to use or to combine to create the final output image pixel. If the pixels could be perfectly registered, then a simple averaging of all pixels that map to one location might suffice. However, the pixels are not perfectly registered with pixels at the edges of the images likely to contain the most positional error. A 3-D graphics, Z-buffer like rule (aka "The Best Pixel" rule, as shown in FIG. 3b) was created to determine pixel selection. The Best Pixel is the pixel that is, in general, closest to the camera. Variations of this rule allow pixels that are within a tolerance of the closest pixel to be averaged to produce the final pixel. One exception was made to the Best Pixel rule. Pixels that are at the shortest distance to the camera from the ground (i.e. directly under the camera's flight path) tend to be replaced too rapidly on successive frames. The rapid replacement may cause a loss of information in the output image and a blurred output appearance. To avoid this situation, the pixels that are within a tolerance of the shortest possible distance to the camera use an alternate distance rule, changing the distance measurement point to the approximate center of the ground image frame, rather than the shortest distance from the ground to the camera. By modifying the distance calculation for the group of pixels closest to the camera, these output pixels do not change as rapidly and do not lose image information, which stabilizes the output image and provides a more visually pleasing and informative mosaic.

Figure 4:
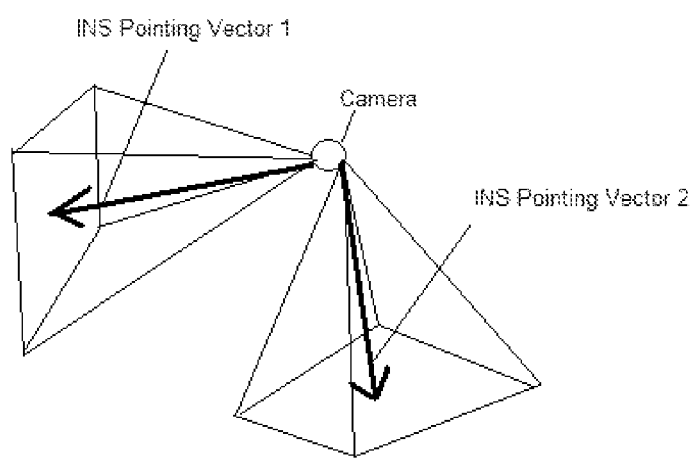
FIG. 4 illustrates the INS pointing vector from the camera plane to the ground plane.

FIG. 4 illustrates the INS pointing or heading vector from the camera to the ground. The pointing vector defines the direction that the camera is looking. The pointing vector is used to calculate the orientation of the camera's image plane.

The GPS coordinates of the camera, the horizontal and vertical camera field of view angles (FOV) as well as the INS orientation angles are used in the calculations to mathematically determine the area of the earth covered. The INS data is provided in the form of pitch, roll and yaw angles, which can be used to generate both a pointing (heading) vector and a rotation matrix. The rotation matrix is used to orient the camera's image plane and the ground area covered by the image.

The sampling rates of GPS measurements and INS measurements may not precisely match the time that a given image was taken. In this case, simple numeric interpolation can be used to estimate intermediate values between two sets of sampled values for GPS and INS data.

A pyramid is constructed using the camera as the apex of the pyramid. The four corners of the pyramid extend from the camera position, through the four corners of the camera image plane and those edges are then extended until they intersect the ground. The corner intersection rays run along the edges of the pyramid as shown in the detailed camera pyramid diagram in FIG. 5.

Figure 6:
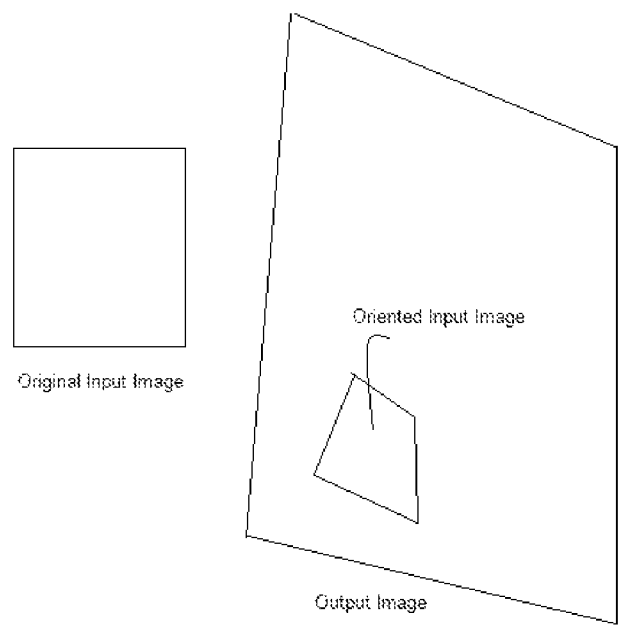
FIG. 6 illustrates the transformation from the rectangular axis aligned image on the left to the rotated trapezoid in the final output image on the right.

Each input image must be scaled, rotated and translated to position the input image to map to the output image. FIG. 6 illustrates the transformation from the rectangular axis aligned image on the left to the rotated trapezoid in the final output image on the right. Input images of video typically overlap but do not have to overlap for the algorithm to provide results.

Utilizing this two-pass process, some embodiments rapidly map multiple overlapping, oblique aerial video images or still images into a single output mosaic utilizing 3-D ray tracing and graphics methodologies to geo-reference the pixels in the original video images to the final output image.

Further details, including specific code instructions of the two-pass process, for computing the mosaic are outlined and further explained below. These details illustrate one of a variety of different embodiments.

Pass One—Positioning and Calculating the Output Image Size:

For each image, compute and accumulate the range of the Image Plane Corner Coordinates:

Step 1: Synchronize Image and Numeric Support Data

If the GPS and INS data was not sampled at the same times that each image was created, then interpolate the GPS and INS data to provide estimates of those values synchronized with each frame. The video, GPS and INS data should each be tagged with a time or relative time that allows a simple linear interpolation to be performed to generate the needed data. Other types of interpolation may be used as appropriate to calculate the data and the direction of motion of the camera.

Step 2: Pointing Vector

Calculate the normalized pointing vector from the INS angular orientation data using the Calculate Pointing Vector computation. Calculate the Pointing Vector and Calculate the Image Plane Rotation Matrix both use the input parameters on angle, angle sign and axis rotation convention as specified by the user for the input data type. Any one of the standard 12 Euler angle conventions may be used to select the rotation axes for each angle. The Euler angle conventions allow the use of all three axes or just two axes for rotation as long as the same axis is not used twice, consecutively. The sign of any angle may be negated and the order of rotation of the angles may be controlled by user supplied input parameters. With 12 Euler Angle Conventions*6 Angle orderings*8 possible combinations of signs for each of the 3 angles ($2^3$=8) there are five hundred seventy six possible combinations of angles axes and signs, one combination of which will control the orientation of the heading vector and the orientation of the image plane. The specific combination used will be determined by the hardware that the data was collected from and can be controlled by user defined parameters. A typical calculation for a specific case is as follows:

Calculate the normalized pointing vector from the INS Pitch, Roll and Yaw orientation angles.

$$\hat{P}_{INS} \cdot x = \cos(\text{Pitch})$$

$$\hat{P}_{INS} \cdot y = \cos(\text{Roll})$$

$$\hat{P}_{INS} \cdot z = -\cos(\text{Yaw})$$

$$mag = \sqrt{\hat{P}_{INS} * \hat{P}_{INS}}$$

$$\hat{P}_{INS} \cdot x = \frac{\hat{P}_{INS} \cdot x}{mag}$$

$$\hat{P}_{INS} \cdot y = \frac{\hat{P}_{INS} \cdot y}{mag}$$

$$\hat{P}_{INS} \cdot z = \frac{\hat{P}_{INS} \cdot z}{mag}$$

Step 3: Rotation Matrix

Build the Image Plane Rotation Matrix (image plane orientation matrix) as the composite of three matrices created from the INS angular orientation data using the Calculate Image Plane Rotation Matrix calculation using one of the 576 possible rotation matrices with a typical sample calculation as follows:

Build the Image Plane Rotation Matrix (image plane orientation matrix) as the composite of three matrices created from the INS angles: P pitch (x-axis), R roll (y-axis), and Y yaw (z-axis) standard matrices as follows using the angles of the corresponding names:

$$P = \begin{bmatrix} 1 & 0 & 0 & 0 \\ 0 & \cos(\text{pitch}) & -\sin(\text{pitch}) & 0 \\ 0 & \sin(\text{pitch}) & \cos(\text{pitch}) & 0 \\ 0 & 0 & 0 & 1 \end{bmatrix}$$

$$R = \begin{bmatrix} \cos(\text{roll}) & 0 & \sin(\text{roll}) & 0 \\ 0 & 1 & 0 & 0 \\ -\sin(\text{roll}) & 0 & \cos(\text{roll}) & 0 \\ 0 & 0 & 0 & 1 \end{bmatrix}$$

$$Y = \begin{bmatrix} \cos(\text{yaw}) & \sin(\text{yaw}) & 0 & 0 \\ -\sin(\text{yaw}) & \cos(\text{yaw}) & 0 & 0 \\ 0 & 0 & 1 & 0 \\ 0 & 0 & 0 & 1 \end{bmatrix}$$

$$RotationMatrix = (R * Y) * P$$

$$RotationMatrixInverse = RotationMatrix^{-1}$$

Step 4: Image Plane Pyramid

Figure 5:
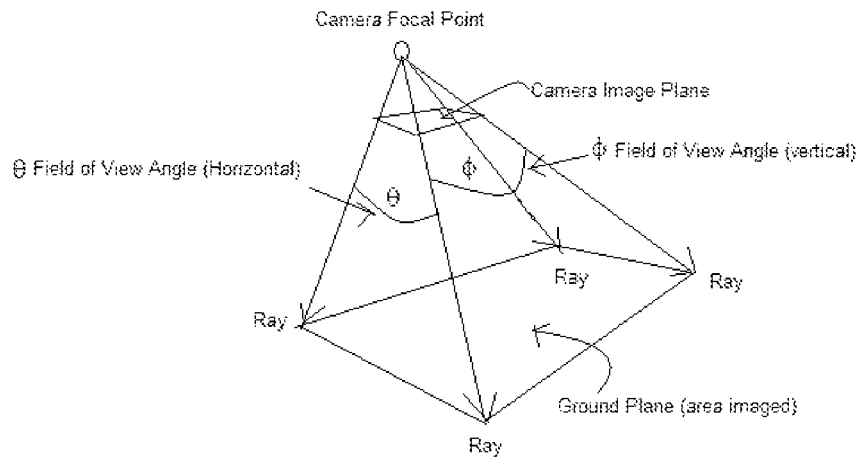
FIG. 5 illustrates the detailed camera pyramid diagram.

As shown in FIG. 5, build the small top Image Pyramid from the camera position and the camera Field of View angles using the Compute Image Plane Pyramid algorithm, which is defined as follows:

As shown in FIG. 5, there are two pyramids formed by the camera FOV angles: the small upper pyramid is between the camera and the image plane while the larger pyramid is between the camera and the ground. Here the coordinates of the smaller pyramid are calculated initially aligned with the coordinate axis. The small image pyramid will then be rotated and translated into the correct position in Cartesian coordinates for a given image based on that image's camera position and pointing vector.

// The eye point is at (0,0,0) and the target point is at (0, ts, 0)
// H=Horizontal Field of View Camera Angle
// V=Vertical Field of View Camera Angle
// FOVM=Field of View Distance in Meters
ts=cos(H*0.5)*FOVM
HO=sin(H*0.5)*FOVM
VO=tan(V)*ts
// The 4 base plane corner coordinates of the Image Pyramid are calculated:

| // Bottom Left Corner | Top Left Corner |
|---|---|
| C[0].x = −HO | C[1].x = −HO |
| C[0].y = ts | C[1].y = ts |
| C[0].z = −VO | C[1].z = VO |

| // Top Right Corner | Bottom Right Corner |
|---|---|
| C[2].x = HO | C[3].x = HO |
| C[2].y = ts | C[3].y = ts |
| C[2].z = VO | C[3].z = −VO |

// Calculate the unrotated base plane center point as the average of the corners:

$$UCP = \frac{1}{4}\sum_{i=0}^{4} C[i]$$

// Calculate the plane origin at the center of the plane and
// translated by the camera position.
O=CameraPosition
DeltaUnrotatedConeBa se. x=2.0*HO
DeltaUnrot atedConeBa se.y=0.0
DeltaUnrot atedConeBa se.y=2.0*VO
//Compute the oriented and translated final image pyramid
for(i=0; i<4;++i)
{
OVP[i]=(RotationMatrix*C[i])+O
}
The pyramid will be rotated into position using the rotation matrix calculated in Step 3. The base of the image pyramid forms a rectangle, which is divided into two triangles used in the Ray Camera Plane Intersection calculation.

Step 5: Earth Plane Pyramid

Convert the camera and the Image Plane base corners from geographic coordinates to Cartesian Coordinates using a standard cartographic approach. A typical algorithm for this type of computation is shown in Standard GPS (Geographic) To Cartesian (Geocentric) Coordinate Conversion The purpose of the Standard GPS (Geographic) To Cartesian (Geocentric) Coordinate Conversion is to convert latitude, longitude, elevation GPS coordinates into XYZ Cartesian coordinates. In an alternative embodiment, a terrain model could be used to provide more accurate ground elevation coordinates for the calculations for a given latitude longitude earth coordinate. In the absence of a terrain model, the user may specify a constant elevation of zero or more in feet or meters. The same algorithm should be used for all conversions for consistency but the conversion algorithm could be any of the standard algorithms available.

$$E^2 = (R_e^2 - R_p^2)/R_e^2$$

$$an = \frac{R_e}{\sqrt{1 - E^2 * \sin(\text{latitude})}^2}$$

$$P \cdot x = (an + \text{elevation}) * \cos(\text{latitude}) * \cos(\text{longitude})$$

$$P \cdot y = (an + \text{elevation}) * \cos(\text{latitude}) * \sin(\text{longitude})$$

$$P \cdot z = (an + (1 - E^2) + \text{elevation}) * \sin(\text{latitude})$$

Next, calculate the earth intersections of the rays beginning at each of the five defining pyramid points (four base corners and camera position). The Ray-Oblate Spheroid Intersection is used for this calculation. All intersections from the camera to the ground are computed using the Ray-Oblate Spheroid Intersection. Compute closest intersection on the Ground using Ray-Oblate Spheroid Intersection calculation in the form of a quadratic equation. There are three possible outcomes: No solution, one solution or two solutions.

Step 6: The Ray-Oblate Spheroid Intersection is defined as follows:
// Note: Constants are computed once at compile time for efficiency
// $R_p^2$ is the constant polar radius squared // $R_e^2$ is the constant equatorial radius squared
// $\hat{r}$ is the input ray whose end point is to intersect with the oblate spheroid
// $\hat{o}$ is the input ray's origin point $$A = R_p^2 * (r.x*r.x + r.y*r.y) + R_e^2(r.z*r.z)$$

$$B = 2 * ((R_p^2 * (r.x*o.x) + (r.y*o.y)) + (R_e^2 * (r.z*o.z)))$$

$$C = R_p^2 * (o.x*o.x + o.y*o.y) + R_e^2 * (o.z*o.z) - (R_e^2 * R_p^2)$$

$$D = B^2 - 4*A*C$$

if (D<0||A<0)-then
return(false);

$$I + \frac{1}{2*A}$$

$$T_0 = \left(-B + \sqrt{D}\right) * I$$

$$T_1 = \left(-B - \sqrt{D}\right) * I$$

// Pick closest distance and preserve sign as the closest intersection.
if ($|T_0| < |T_1|$) then
$T = T_0$
else
$T = T_1$
// Compute the closest solution point in vector equation form:

$$\hat{P} = \hat{o} + T * \hat{r}$$

Next, calculate the geographic coordinates for each Cartesian coordinate calculated in step b using a standard cartographic approach. A typical algorithm for this type of computation is shown in Standard Cartesian (Geocentric) To GPS (Geographic) Coordinate Conversion
Step C: Standard Cartesian (Geocentric) to GPS (Geographic) Coordinate Conversion The purpose of the Standard Cartesian (Geocentric) To GPS (Geographic) Coordinate Conversion is to convert 3-D XYZ Cartesian coordinates into GPS coordinates in terms of latitude, longitude, and elevation. In an alternative embodiment, a terrain model could be used to provide more accurate ground elevation coordinates for the calculations for a given latitude longitude earth coordinate. In the absence of a terrain model, the user may specify a constant elevation of zero or more in feet or meters. The same algorithm should be used for all conversions for consistency but the conversion algorithm could be any of the standard algorithms available.

$$p = \sqrt{P \cdot x^2 + P \cdot y^2}$$

if ($p < 1e^{-9}$)
{
    // Point on Z axis longitude = 0 latitude = $\pi/2$ elevation = $P \cdot z - R_P$ if ($P \cdot z < 0$) latitude = $-\pi/2$
}
else
{

$$\text{longitude} = \tan^{-1}\left(\frac{P \cdot y}{P \cdot x}\right)$$

$$r = \sqrt{p^2 + P \cdot z^2}$$

$TanMu =$ $$P \cdot z * \left(\sqrt{1-E^2}\right) / p * \left(1 + R_3 E^2 / \left(r * \sqrt{1-E^2}\right)\right)$$

$$\mu = \tan^{-1}(TanMu)$$

$TanLatitude =$ $$\frac{P \cdot z + R_e E^2 * \sin^3(\mu)/\sqrt{(1-E^2)}}{p - R_e E^2 \cos^3(\mu)}$$

$$\text{latitude} = \tan^{-1}(TanLatitude)$$

$$N = \frac{R_e}{\sqrt{(1 - E^2 \sin^2(\text{latitude}))}}$$

$$\text{elevation} = p * \cos(\text{latitude}) +$$

$$P \cdot z * \sin(\text{latitude}) - R_e^2 / N$$

}

Next, compute the range of the earth intersection coordinates computed in the step c above for the current image.

Optionally, test for images where the camera was not pointing entirely at the earth. Images that fail this test will be discarded to avoid distorting the mosaic.

Step 6: Miscellaneous Image Range Calculations

For images that do not fail the previous step, accumulate the current image's range into the output image.

Save the cropped input image's corners in pixels. Images may be cropped at the user's discretion to remove black edges at the edge of each frame.

Calculate the frame range delta values from the range of the current image.

DeltaRange=MaxRange−MinRange

Calculate the center point of the current Cartesian coordinate input frame range delta and the min point of the frame.

FrameCenter=(DeltaRange*0.5)+MinRangeCoordinate

Calculate the input image's position in the output image using the Compute Output Pixel Position algorithm defined as follows:

Compute Output Pixel Position

Load current unrotated image corners based on input image height(H) and width(W). Then rotate and translate the image corners to align the input image to its final output image orientation. FIG. 6 illustrates this image orientation process.

// Initialize the 4 base plane corner coordinates of the Image Pyramid
// to the unrotated image size.

| // Bottom Left Corner | Top Left Corner |
|---|---|
| C[0].x = 0 | C[1].x = 0 |
| C[0].y = 0 | C[1].y = Height |
| C[0].z = 0 | C[1].z = 0 |

| // Top Right Corner | Bottom Right Corner |
|---|---|
| C[2].x = Width | C[3].x = Width |
| C[2].y = Height | C[3].y = 0 |
| C[2].z = 0 | C[3].z = 0 |

// Translate the image center point to the origin, rotate the image and
// translate back so that the image is translated about the center point
// of the image. The final coordinate values will be the coordinate locations
// of the output image.
IC.x=InputWidth*0.5
IC.y=InputHeight*0.5
for(i=0;i<4;++i)
{
O[i]=(RotationMatrix*(C[i]−IC))+IC
}
Next, calculate the input image pixel scale in vector form as $$DeltaPixel = \max\left(1.0, (RangeMaxPixel - RangeMinPixel)\right)$$

$$DeltaPixelScale = \frac{DeltaPixel}{MaxInputRange - MinInputRange}$$

Accumulate the DeltaPixelScale into the Output Image Scale Range.
For Pass Two: Calculate the latitude and longitude start angles and arc lengths as:
LongitudeStartAngle=OutputGlobalRangeLongitudeMin
DeltaLongitude=OutputGlobalRangeLongitudeMax−OutputGlobalRangeLongitudeMin
LongitudeChordArcLength=$R_e$*DeltaLongitude
LongitudePixelsPerArcLength=OutputWidth/LongitudeChordArcLength
LatitudeStartAngle=OutputGlobalRangeLatitudeMin
DeltaLatitude=OutputGlobalRangeLatitudeMax−OutputGlobalRangeLatitudeMin
LatitudeChordArcLength=$R_e$*DeltaLatitude
LatitudePixelsPerArcLength=OutputHeight/LatitudeChordArcLength
If more input data return to Step 1 and continue. Go to Step 7 otherwise.
Step 7: Calculating the Output Size
Calculate the Cartesian 3-D Output Center from the global coordinate range accumulated in the previous steps in vector form:

CenterOutput$XYZ$=GlobalRangeMin+(GlobalRangeMax−GlobalRangeMin)*0.5

Calculate the Largest Number of Pixels Per Unit of Measurement:

GlobalPixelScale=|ImageScaleRange|

Calculate the initial virtual output image size in Vector form and make a multiple of 4:

DeltaImageRange=GlobalRangeMax−GlobalRangeMin

OutputSize=((int)(DeltaImageRange*GlobalPixelScale)*4)/4

Output size may be further refined according to file size or memory limitations. Multiple files may be used and easily panned to simulate a single virtual mosaic file.

Create an output bitmap of the size just calculated for use in Pass Two as described below.
Pass Two—Mapping the Input Images to the Output Image:
Pass Two utilizes the data calculated in Pass One as well as some additional Pass Two only calculations made on the same data.
Either the Pass One data may be saved in memory or in a file or the computations may all be calculated again to save space.
Step 1: Pass One Numeric Data
For each image: Retrieve or re-compute the numeric data for that image as in Pass One. This numeric data includes the original GPS, INS and camera angle data as well as the additional values computed from this data.
For Pass 2, compute the output image corners of the input mosaic using the latitude longitude ground coordinates at the earth intersections of the input image corners and the Compute Normalized Image Coordinates Master (Geographic) algorithm, defined as follows:
From the input ground latitude, longitude coordinates compute the integer output image coordinates. The output image indices will be clamped to valid output image indices.

$X$=(long)($R_e$*(Ground.longitude−OutputLongitudeStartAngle)*OutputLongitudePixelPerArcLength)

$Y$=(long)($R_e$*(Ground.latitude−OutputLatitudeStartAngle)*OutputLatitudePixelPerArcLength)

$X$=max($X$,0)

$X$=min($X$,OutputWidth−1)

$Y$=max($Y$,0)

$Y$=min($Y$, OutputHeight−1)

These calculations are used as a simple transform of X and Y from geographic coordinates to pixels. Any standard Mapping Transform that converts geographic coordinates to the appropriate standard Map Projection Transform may be used in place of this simple transform. A standard Mapping Transform may be applied so that the image has the same projection applied to it as a map which also can be projected on a display.
Step 2: Extract Image
Read the video and extract the image for the current frame
Step 3: Compute Shortest Distance To Camera for Frame
Using the camera position as the origin and the previously computed pointing vector as the ray, compute the shortest distance in the viewing direction to the oblate spheroid. The shortest distance in the viewing direction will be the intersection of the earth with a ray starting at the camera in the direction of the pointing vector. The Ray-Oblate Spheroid Intersection as described above is used for this calculation.
Step 4: Pixel Mapping
For each pixel in the output image, map the pixel to the input image. This process consists of determining the row and column indices in the output image based on the position within the original input image, the geo-referenced coordinates of the output image and the input image's position within the final output image. The Map Pixel algorithm is used for this step. The algorithm is defined as follows:
Step 4a: Compute Output Image Corner Indices for Current Input Image:
For each of the four input image corners take the earth intersection coordinates in latitude, longitude form and compute the output image indices using Compute Normalized Image Coordinates Master (Geographic) as defined above.

Step 4b: Compute Start and Stop Output Image Indices

Compute the minimum and maximum output image indices from the four corner indices computed in Step 1. These indices form the reverse map image indices.

```
for(i=0; i<4; ++i)
{
StartIndex.x=min(OutputCorner[i].x)
StartIndex.y=min(OutputCorner[i].y)
Stopindex.x=max(OutputCorner[i].x)
Stopindex.y=max(OutputCorner[i].y)
}
```

If images remain to be processed go to Pass Two Step 1 else go to Step 4c.

Step 4c: Compute Rectified Corner Output Image Indices

Sort the output of step 4b so that the corners are arranged bottom to top in y. The second step arranges the bottom edge and the top edge vertices in left to right order in x in terms of the output image indices. The first two elements define the bottom edge and the last two elements define the top edge. Note that the bottom and top edges may not be horizontal. Similarly, the left and right edges may not be vertical. As shown in FIG. 6, the input image is rectangular but when mapped to the output image the input may become a quadrilateral and lose the original rectangular shape.

The rectified corner image map will contain the pixel locations of the image as well as the ground coordinates corresponding to those pixel locations.

Step 4c(1):
  Sort the output corner data from Step 4b by the value of the y (column) index. Result is in the RectifiedCornerImageMap Step 4c(2):
  Sort the result of Step 4c(1) based on the x (row) index as follows:
  If needed, interchange the first two elements in the array so that RectifiedCornerImageMap[0].x<RectifiedCornerImageMap [1].x
  If needed, interchange the second two elements in the array so that RectifiedCornerImageMap [2].x<RectifiedCornerImageMap [3].x Step 4d: Reverse Map Pixels to Output Image To avoid moiré patterns in the output image, use a reverse image mapping to map the output row and column (x,y) indices back to the input image. The reverse mapping ensures that every pixel in the output image is mapped to an input pixel. A forward mapping from input to output can leave gaps in the output image leading to gaps and distorted moiré patterns in the output.

Figure 7:
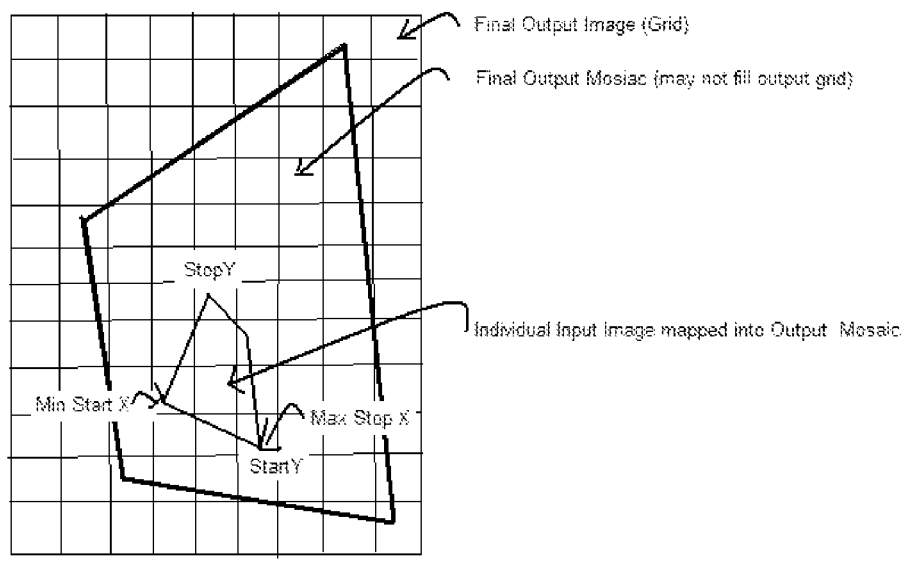
FIG. 7 illustrates the mapping of an input image to the output mosaic within an output image.

The reverse output mapping proceeds along each column in the output image to which the current input image maps. The start and stop output image indices calculated in Step 4b will restrict the mapping of the input image pixels into the correct area of the output image. Each column of output is treated as a trapezoid with start and stop output indices in x calculated along the trapezoidal boundaries, as shown in FIG. 7.

```
for(j=StartY, j<StopY; ++i)
{
  Compute StartX and StopX Indices on Trapezoid algorithm
```

$$IndexOut=j*OutputWidth+StartX$$

$\hat{G}$=GroundCoordinateStart
$\hat{D}$=GroundCoordinateStop−GroundCoordinateStart $$if\ (StartX \neq StopX)\hat{D} = \frac{\hat{D}}{StopX - StartX}$$

```
for(i=StartX, i<StopX; ++j)
{
  If(i==StopX)
  {
    Ĝ=GroundCoordinateStop}
}
```

Calculate the intersection point of the ray from the current ground point to the intersection point on the camera image plane with the Ray Camera Plane Intersection defined below:

Ray Camera Plane Intersection
//Note Rectangular Image Plane is defined as 2 triangles
// Triangle 1 is tested for an intersection with the ray first.
// Triangle 2 is tested if the test on triangle 1 fails

```
bIntersects=RayTriangleIntersection(PlaneTriangle1, Intersection) if(bIntersects==false)
{
bIntersects=RayTriangleIntersection(PlaneTriangle2, Intersection)
}
if(bIntersects==true)
{
ComputeNormalizedImagePlaneCoordinate(Intersection)
}
return(bIntersects)
```

InputX and InputY will be returned if an intersection exists.
  If the ray intersects
  {
    IndexIn=InputY*InputWidth+InputX // Best Pixel Rule distance calculations
    // Get vector V as the vector between the
    // ground point and the camera.
    // Get the length of the vector as the distance.

$\hat{V}=\hat{G}\hat{C}_{Camera}$ $Dist=\sqrt{(V.x)^2+(V.y)^2+(V.z)^2}$

If(DistanceToCamera≤BestPixelDistanceTolerance)
{
    // Recalculate V between the ground point and
    // image center. Recalculate distance.

$\hat{V}=\hat{G}-\hat{C}_{Image}$ $Dist=\sqrt{(V.x)^2+(V.y)^2+(V.z)^2}$

}
Delta=OutputImage[IndexOut].Distance−Dist
// If the pixels
If((OutputImage[IndexOut] loaded=false)||
(Delta>BestPixelTolerance))
{
OutputImage[IndexOut]Distance=Dist
OutputImage[IndexOut].Pixel=InputImage[IndexIn]
OutputImage[IndexOut].Counter=1.0
OutputImage[IndexOut].Loaded=true}
}
else
{
If(|Delta|<BestPixelTolerance)
{

OutputImage[IndexOut]Distance=Dist
OutputImage[IndexOut].Pixel+=
InputImage[IndexIn]
OutputImage[IndexOut].Counter+=1.0;
      }
     }
    }
// Increment the output image index and the current ground point G.
++IndexOut $\hat{G}$+=$\hat{D}$

}
}

Compute Start and Stop Indices on Trapezoid

Given the edges defined in the RectifiedCornerImageMap calculated in Step 4, compute the start and stop indices and corresponding ground coordinates in columns x for the input row j.

```
i=0;
k = 0; // Intersection Count
bReturnStatus=false;
while( (k< 2) AND (i<4))
{
   bFound = CalculateIntersectionPoint( i, j, RectifiedCornerImageMap,
   Point[k])
   if(bFound == true )
   {
      bReturnStatus=true;
      If( k == 0 )
      {
         ++k;
      }
      else
      {
         If Point[0] == Point[1] )
         {
            // Check for duplicates, look for a second unique
            intersection
            ++k;
         }
         else
         {
            Sort Points left to right in X
            return( true)
         }
      }
   }
   ++i;
}
return(false)
```

CalculateIntersectionPoint

Figure 8:
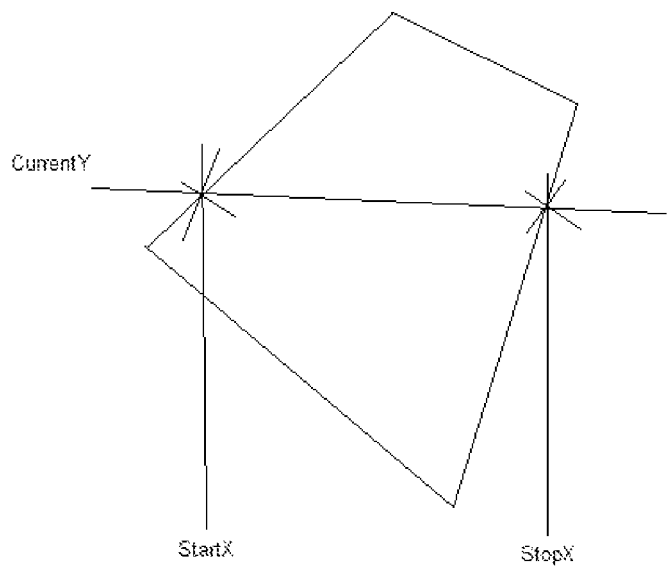
FIG. 8 illustrates the boundary intersections of two image corners to define a trapezoidal boundary edge.

Given two image corners as ground coordinates to define a trapezoidal boundary edge, determine at which x point (if any) the current y as a ground coordinate intersects the input boundary edge. FIG. 8 illustrates the boundary intersections.

Calculate the intersection using a standard parametric line intersection routine to determine the distance parameter T. If the intersection in ground coordinates exists, then a second computation will be made to compute the needed pixel coordinate.

For efficiency, reject trivial cases where the current y value is not in range of the edge.

Compute the intersection parameter t from the image coordinates for Y:

$$DeltaY = StopY - StartY$$

$$t = \frac{CurrentY - StartY}{DeltaY}$$

In vector form the intersection ground point P using the start and stop ground coordinates of the corner is:

$$\hat{P} = \hat{G}_{start} + t*(\hat{G}_{stop} - \hat{G}_{start})$$

The corresponding image coordinate for the intersection clamped to the output image range for the input image is:

$$x = StartX + t*(StopX - StartX)$$

$$x = \max(x, MinOutputX)$$

$$x = \min(x, MaxOutputX)$$

Step 4e: Ray Triangle Intersection
// Uses Barycentric (triangle centric) Coordinates to compute intersection
// Define Barycentric Point in terms of triangle vertices $V_0$, $V_1$, $V_2$:
$P(u,v,w) = w*V_0 + u*V_1 + v*V_2$ where $u+v+w=1$ The ray in vector form originating at point P and a distance t from P along direction vector d:

$$\hat{R} = P + t\hat{d}$$

Compute scalar c as the inverse of the cross product of ray direction with the edge between vertex 2 and vertex 0 and then take the dot product of that cross product with the edge between vertex 1 and vertex 0.

$$c = \frac{1}{\left(\left(\hat{d} \times (V_2 - V_0)\right) * (V_1 - V_0)\right)}$$

$$\begin{bmatrix} t \\ u \\ v \end{bmatrix} = c * \begin{bmatrix} ((P - V_0) \times (V_1 - V_0) * (V_2 - V_0)) \\ \left(\hat{d} \times (V_2 - V_0)\right) * (P - V_0) \\ \left((P - V_0) \times (V_1 - V_0) * \hat{d}\right) \end{bmatrix}$$

if $((u + v) > 1.0)$return(false)

Intersection $= P + t * \hat{d}$

Step 4f: Compute Normalized Image Plane Coordinate from Cartesian Intersection

Translate the Cartesian image plane intersection point back to the origin at the camera position on the base of the image pyramid. This point will then be rotated to align with the axes. The point on the image plane will then be normalized.
O=CameraPosition
T=Intersection−O
U=RotationMatrix$^{-1}$*T
Compute normalized image plane coordinate values over the range [−1,1]

$$N \cdot x = \frac{2 * U \cdot x}{DeltaUnrotatedConeBase \cdot x}$$

Note: Here 2*d* N.y for the image is computed in terms of the 3-D cone base Z since the delta y on the unrotated cone base is 0.

$$N \cdot y = \frac{2 * U \cdot z}{DeltaUnrotatedConeBase \cdot z}$$

Compute the rounded image plane integer coordinate values from the normalized image plane continuous values:
I.x=Round(((N.x+1)*0.5*InputWidth))
I.y=Round(((N.y+1)*0.5*InputHeight))
Clamp the pixel to the cropped input image if needed:
I.x=max(I.x,CroppedInputWidthMinPixel)
I.x=min(I.x,CroppedInputWidthMaxPixel)
I.y=max(I.y,CroppedInputHeightMinPixel)
I.y=min(I.y,CroppedInputHeightMaxPixel)
Step 5: Scale Output Image and Output Data
    For (i=0; i<(OutputWidth*OutputHeight); ++i)
    {
      If(OutputImage[i].Count !=0)
      {
        OutputImage[i].Pixel/=OutputImage[i].Count
      }
      Copy OutputImage[i] to corresponding pixel in final output buffer.
    }
Other variations obvious to one of ordinary skill in the art include:
- Mosaicking into sub-images that are adjacent to each other to manage the size of large mosaics
- Allowing the user to zoom in on a large mosaic and create a sub-mosaic at a larger scale than the full mosaic. This process could be done real-time to show more detail in a sub-area of interest. The data could be accessed by tracking by range the original individual images used to create that zoomed area in the larger mosaic. A database could be used to store this information for fast query and retrieval
- Using a terrain model when available to provide a precise ground elevation value to calculate the ground intersections and coordinates
- Altering the Best Pixel rule to allow different pixel combining techniques such as weighted averages of color values.
- Mosaicking a single image using the concept of virtual coordinates. The virtual mosaic coordinate would be converted to a smaller tiled mosaic coordinate to conserve memory or storage space. The real mosaic may reside in multiple adjacent tiled images in separate files.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be a tangible medium (e.g., optical or analog communications lines). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink-wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art could make various modifications that will achieve some of the advantages of the invention without departing from the true scope of the invention.

What is claimed is:

1. A computer-implemented method of generating a mosaic digital image from a plurality of pixilated images, the method comprising:
defining an output image having a resolution and comprising a plurality of output image portions, each output image portion comprising at least one output pixel;
receiving a plurality of input images, each input image of the plurality of input images being of a corresponding ground area of an astronomical body and comprising a plurality of input pixel values;
mathematically dividing the ground area of the astronomical body, based on the resolution of the output image, to define a plurality of ground area portions;
using ray-tracing mathematics to map each ground area portion of the plurality of ground area portions to a corresponding output image portion of the plurality of output image portions; and
assigning values to the at least one output pixel of the output image, based on the mapping of the plurality of ground area portions to the plurality of output image portions and the input pixel values in the plurality of input images.

2. A method according to claim 1, further comprising scaling, rotating and translating each input image of the plurality of input images according to coordinates of a camera that acquired the input image, orientation of the camera and field of view of the camera.

3. A method according to claim 1, further comprising discarding an input image of the plurality of input images, for which fewer than a predetermined number of locations on the astronomical body correspond to respective locations in the input image.

4. A method according to claim 1, wherein defining the output image comprises:
using a mathematical model of a surface shape of the astronomical body and 3-D ray tracing, from a model of a camera image plane of a camera that acquired the plurality of input images to the model of the surface of the astronomical body, to determine a plurality of locations on the surface of the astronomical body corresponding to respective locations in the plurality of input images to determine an extent to which the surface of the astronomical body was imaged by the plurality of input images;

determining boundaries of the output image, based at least in part on the determined extent to which the surface of the astronomical body was imaged by the plurality of input images; and determining a number of the at least one output pixel in the output image, based at least in part on the determined boundaries of the output image.

5. A method according to claim 4, wherein assigning the values to the at least one output pixel of the output image comprises, for each output pixel within the determined boundaries of the output image:

using the mathematical model of the shape of the astronomical body and reverse 3-D ray tracing, from the model of the surface of the astronomical body to the model of the camera image plane, in each of at least one candidate input image of the plurality of input images, determining a candidate input pixel in the candidate input image that geographically corresponds to the output pixel, thereby determining at least one candidate input pixel; and making the value of the output pixel equal to an average of values of at least two of the at least one candidate input pixel.

6. A method according to claim 4, wherein assigning the values to the at least one output pixel of the output image comprises, for each output pixel within the determined boundaries of the output image:

using the mathematical model of the shape of the astronomical body and reverse 3-D ray tracing, from the model of the surface of the astronomical body to the model of the camera image plane, in each of at least one candidate input image of the plurality of input images, determining a candidate input pixel in the candidate input image that geographically corresponds to the output pixel, thereby determining at least one candidate input pixel; and making the value of the output pixel equal to a weighted average of values of at least two of the at least one candidate input pixel.

7. A method according to claim 4, wherein using the mathematical model of the surface shape of the astronomical body comprising modeling the surface shape of the astronomical body as an oblate spheroid.

8. A method according to claim 4, wherein using the mathematical model of the surface shape of the astronomical body comprises employing a terrain model in addition to a geometric model of the surface shape of the astronomical body.

9. A method according to claim 4, wherein assigning the values to the at least one output pixel of the output image comprises, for each output pixel within the determined boundaries of the output image:

using the mathematical model of the shape of the astronomical body and reverse 3-D ray tracing, from the model of the surface of the astronomical body to the model of the camera image plane, in at least one candidate input image of the plurality of input images, determining a candidate input pixel that geographically corresponds to the output pixel, thereby determining at least one candidate input pixel; and making the value of the output pixel equal to the value of one of the at least one candidate input pixel.

10. A method according to claim 9, wherein, determining the candidate input pixel comprises, for the at least one candidate input image, selecting one of the plurality of input images having a shortest distance between the camera image plane and the surface of the astronomical body, when the one of the plurality of input images was acquired by the camera.

11. A method according to claim 9, wherein:

determining the candidate input pixel comprises selecting a plurality of candidate input images having shortest respective distances between the camera image plane and the surface of the astronomical body, when respective ones of the plurality of candidate input images were acquired by the camera; and assigning the values to the at least one output pixel of the output image comprises, for each output pixel within the determined boundaries of the output image, assigning a value to the output pixel, based on an average value of candidate pixels in the selected plurality of candidate input images.

12. A method according to claim 9, wherein determining the candidate input pixel comprises selecting a candidate input image having a shortest distance between a geographic location corresponding to the output pixel and a geographic location corresponding to a center of a projection of the of the camera onto the surface of the astronomical body when the at least one candidate input image was acquired by the camera.

13. A method according to claim 9, wherein:

determining the candidate input pixel comprises selecting a plurality of candidate input images that have shortest respective distances between a geographic location corresponding to the output pixel and a geographic location corresponding to a center of a projection of the of the camera onto the surface of the astronomical body when ones of the plurality of candidate input images were acquired by the camera; and assigning the values to the at least one output pixel comprises assigning a value to the output pixel, based on an average of values of candidate input pixels in the selected plurality of candidate input images.

14. A system for generating a mosaic digital image from a plurality of pixilated images, the system comprising:

a computer processor programmed to:

define an output image having a resolution and comprising a plurality of output image portions, each output image portion comprising at least one output pixel;

receive a plurality of input images, each input image of the plurality of input images being of a corresponding ground area of an astronomical body and comprising a plurality of input pixel values;

mathematically divide the ground area of the astronomical body, based on the resolution of the output image, to define a plurality of ground area portions;

use ray-tracing mathematics to map each ground area portion of the plurality of ground area portions to a corresponding output image portion of the plurality of output image portions; and assign values to the at least one output pixel of the output image, based on the mapping of the plurality of ground area portions to the plurality of output image portions and the input pixel values in the plurality of input images.

15. A computer program product for generating a mosaic digital image from a plurality of pixilated images, the computer program product comprising a tangible, non-transitory computer-readable medium having computer readable program code stored thereon, the computer readable program code configured to cause a processor to:

- define an output image having a resolution and comprising a plurality of output image portions, each output image portion comprising at least one output pixel;
- receive a plurality of input images, each input image of the plurality of input images being of a corresponding ground area of an astronomical body and comprising a plurality of input pixel values;
- mathematically divide the ground area of the astronomical body, based on the resolution of the output image, to define a plurality of ground area portions;
- use ray-tracing mathematics to map each ground area portion of the plurality of ground area portions to a corresponding output image portion of the plurality of output image portions; and
- assign values to the at least one output pixel of the output image, based on the mapping of the plurality of ground area portions to the plurality of output image portions and the input pixel values in the plurality of input images.

* * * * *

UNITED STATES PATENT AND TRADEMARK OFFICE
CERTIFICATE OF CORRECTION

PATENT NO.        : 8,693,806 B2                               Page 1 of 1
APPLICATION NO.   : 13/679597
DATED             : April 8, 2014
INVENTOR(S)       : Elaine S. Acree It is certified that error appears in the above-identified patent and that said Letters Patent is hereby corrected as shown below:

In the Claims:

In column 20, line 26
Replace "projection of the of the"
With "projection of the"

In column 20, line 34
Replace "projection of the of the"
With "projection of the"

Signed and Sealed this
Eighth Day of July, 2014

Michelle K. Lee
*Deputy Director of the United States Patent and Trademark Office*